United States Patent [19]

Münzmay et al.

[11] Patent Number: 5,284,928
[45] Date of Patent: Feb. 8, 1994

[54] MODIFIED POLYUREAS CONTAINING N-CYANAMINOCARBONYL UREA GROUPS AND A PROCESS FOR THEIR PREPARATION

[75] Inventors: Thomas Münzmay, Dormagen; Tillmann Hassel, Cologne, both of Fed. Rep. of Germany

[73] Assignee: Bayer Aktiengesellschaft, Leverkusen, Fed. Rep. of Germany

[21] Appl. No.: 956,518

[22] Filed: Oct. 5, 1992

[30] Foreign Application Priority Data

Oct. 10, 1991 [DE] Fed. Rep. of Germany .... 4133572.4

[51] Int. Cl.⁵ .................. C08G 18/77; C08G 18/82
[52] U.S. Cl. ........................ 528/52; 525/452; 528/57; 528/68; 528/71; 528/73
[58] Field of Search .................. 525/452; 528/68, 73, 528/52, 57, 71

[56] References Cited

U.S. PATENT DOCUMENTS

| | | | |
|---|---|---|---|
| 3,252,945 | 5/1966 | Ugi et al. | 528/51 |
| 4,465,825 | 8/1984 | Lin | 528/68 |
| 4,619,966 | 10/1986 | Schäfer et al. | 524/589 |
| 4,707,369 | 11/1987 | Suresky | 426/417 |
| 4,707,386 | 11/1987 | Schäfer et al. | 525/454 |
| 4,895,921 | 1/1990 | Schäfer et al. | 528/45 |
| 4,918,135 | 4/1990 | Probst et al. | 524/714 |

FOREIGN PATENT DOCUMENTS 043651 1/1982 European Pat. Off.

Primary Examiner—Maurice J. Welsh
Assistant Examiner—Rabon Sergent
Attorney, Agent, or Firm—Joseph C. Gil, Thomas W. Roy

[57] ABSTRACT

The present invention relates to polyureas which contain anionic N-cyanaminocarbonyl urea groups corresponding to formula (I)

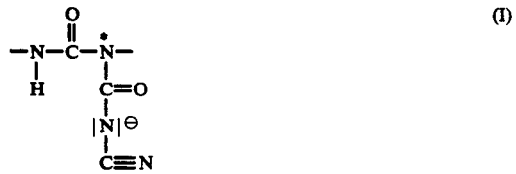

incorporated in the polymer chain and, optionally, terminal anionic cyanourea groups corresponding to formula (II)

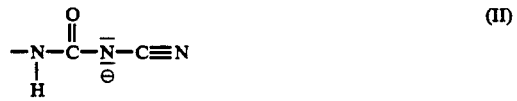

wherein the ratio of incorporated groups (I) to terminal groups (II) is more than 1:1, preferably more than 2:1.

The present invention also relates to a process for the preparation of these polyureas.

11 Claims, No Drawings

MODIFIED POLYUREAS CONTAINING N-CYANAMINOCARBONYL UREA GROUPS AND A PROCESS FOR THEIR PREPARATION

BACKGROUND OF THE INVENTION

1. Field of the Invention

This invention relates to new polyureas modified by neutralized N-cyanaminocarbonyl urea groups and to a process for their production.

2. Description of the Prior Art

Aqueous solutions or dispersions of anionically modified polyisocyanate addition products, more particularly aqueous dispersions of anionically modified polyurethanes or polyurethane ureas, and their use for the production of coatings are known [cf. for example DE-PS 1 184 946, DE-PS 1 178 586, DE-AS 1 237 306, DE-OS 1 495 745, DE-OS 1 595 602, DE-OS 1 770 068, DE-OS 2 019 324, DE-OS 2 314 512 and also Angew. Chem 82, 53 (1970)].

The dispersibility of the polyisocyanate polyaddition products present in these dispersions is based on the presence of incorporated ionic centers, especially incorporated sulfonate or carboxylate groups. In the production of coatings from these dispersions, the ionic centers generally remain in the resulting coatings, which causes a reduction in the water resistance of the coating.

Water-dispersible polyisocyanate addition products modified by anionic cyanourea groups are also known (cf. DE-OS 3 441 934; 3 600 595; 3 735 198 and 3 813 840). Coatings obtained from dispersions such as these are considerably more water-resistant than coatings obtained from standard PUR dispersions because, after losing the counterion, the hydrophilicizing cyanourea anions acquire a self-crosslinking character and thus lose their hydrophilic properties after crosslinking. In addition, dispersions of the type in question can also be crosslinked with other crosslinking agents, for example polyepoxides.

A disadvantage is that the incorporation of the hydrophilicizing cyanourea groups in accordance with the previously described German references is a chain-terminating reaction. As a result, the molecular weight which the polyurethanes are capable of reaching is limited by the number of cyanourea groups required for dispersion. In extreme cases, the effect of this can be that the molecular weight capable of being reached in the case of very fine particle dispersions requiring a high content of hydrophilicizing groups is so low that the products are no "longer film-forming. However, fine particle PUR dispersions are advantageous in terms of processing because they have good flow and, with the proper molecular weight, are characterized by excellent film formation.

By contrast, synthesis components for incorporating lateral, hydrophilic carboxylate and/or sulfonate groups into the polyurethanes or polyurethane-ureas are strictly difunctional in the context of polyurethane chemistry. Therefore, the amount of hydrophilic groups incorporated does not affect the molecular weight buildup of the polymer. The direct consequence of this is that virtually any desired molecular weight can be obtained. The hydrophilicizing groups are laterally incorporated into the polyurethanes of the type in question.

An object of the present invention is to provide anionically modified polyureas which combine the advantages of the two types of hydrophilic polyurethanes and polyurethaneureas previously described, i.e., 1) the use of hydrophilic components which crosslink spontaneously after drying to avoid the problems caused by the presence of hydrophilic groups in the resulting coating and 2) the use of hydrophilic components which may be incorporated without affecting molecular weight buildup to avoid the difficulties associated therewith.

This object may be achieved in accordance with the present invention as described hereinafter.

SUMMARY OF THE INVENTION

The present invention relates to polyureas which contain anionic N-cyanaminocarbonyl urea groups corresponding to formula (I)

incorporated in the polymer chain and, optionally, terminal anionic cyanourea groups corresponding to formula (II)

wherein the ratio of incorporated groups (I) to terminal groups (II) is more than 1:1, preferably more than 2:1.

The present invention also relates to a process for the production of these polyureas by reacting a polyurea containing oxadiazinetrione structural units corresponding to formula (III)

and/or uretdione structural units corresponding to formula (IV)

with a cyanamide salt corresponding to formula (V)

wherein $Ka^{\oplus}$ is an alkali metal ion or an optionally substituted ammonium ion.

DETAILED DESCRIPTION OF THE INVENTION

In the context of the invention, the expression "polyureas" also encompasses polyurethane ureas.

The polyureas according to the invention preferably contain 5 to 100, preferably 10 to 35, milliequivalents of N-cyanaminocarbonyl urea groups (I) and less than 50, preferably less than 35, more preferably less than 5 and most preferably less than 3.5 milliequivalents cyanourea groups (II), based on 100 g of modified polyurea.

Groups "incorporated in the polymer chain" as opposed to "terminal" groups are understood to be groups corresponding to formula (I) in which the free valency at N* in formula (I) on a statistical average is connected by a residue having an average molecular weight of greater than 500, preferably greater than 1000 and more preferably greater than 1500.

Although the use of diisocyanates containing oxadiazonetrione or uretdione structural units for the synthesis of polyisocyanate addition products has been described in DE-OS 3 441 934 cited above, the fact that these structures are described as inert to cyanamide salts in the German reference (page 12) means that there is nothing in this reference which teaches or suggests achieving the objectives of the present invention, i.e., the introduction of hydrophilic crosslinkable groups without any loss of isocyanate groups, particularly because according to this reference the desired hydrophilicity is achieved by incorporating terminal cyanourea groups. Even assuming that the oxadiazine-trione or uretdione units of the products according to DE-OS 3 441 934 reacted to form N-cyanaminocarbonyl urea groups corresponding to formula (I), the claimed quantities of I and the claimed ratio of I to II are not obtained.

In addition, it is extremely surprising that polyisocyanate prepolymers containing oxadiazinetrione or uretdione structural units can be chain extended with amines without these units significantly co-reacting. This is because, according to DE-OS 3 232 736, uretdione groups are reactive with aliphatic amines even at temperatures below 50° C. Oxadiazinetriones react with aliphatic amines almost instantaneously, even below room temperature, with biuret formation (Bull. Soc. Chim. France 1972, 242–51, ibid. 1974, 1497–1505. This reaction can be used for crosslinking polyurethanes containing oxadiazinetrione units in the polymer chain by reaction with diamines (U.S. Pat. No. 4,546,153). Accordingly, any attempt at chain extension with diamines would have been expected to result in crosslinking of the isocyanate prepolymers such that the resulting product would be unsuitable for the purposes of the present invention.

The unmodified polyureas suitable for the production of the modified polyureas of the present invention can be produced by initially preparing an NCO prepolymer having an NCO content of 0.5 to 10%, preferably 1.5 to 7.5%, by weight from components a); relatively high molecular weight and, optionally, low molecular weight components b), c) and/or d); and subsequently reacting this NCO prepolymer with low molecular weight compounds b), c), d) and/or f).

In a preferred embodiment, the unmodified polyureas suitable for the production of the modified polyureas according to the invention are obtained by chain-extension of an NCO prepolymer with low molecular weight compounds from the series of polyamines and aminoalcohols to a conversion of the NCO groups of the prepolymer of 30 to 95% and preferably 50 to 80% and subsequent chain extension with water.

In the production of the NCO prepolymer, diisocyanates corresponding to formulae (VI) and/or (VII)

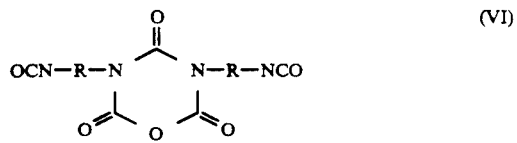

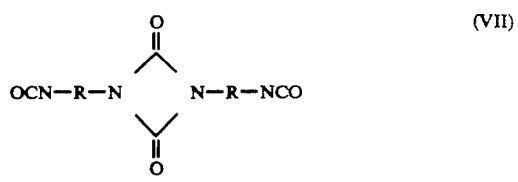

wherein R may be the same of different and represent the difunctional radical of an aliphatic hydrocarbon containing 1 to 15 carbon atoms, a cycloaliphatic hydrocarbon containing 3 to 15 carbon atoms, an araliphatic hydrocarbon containing 7 to 15 carbon atoms or an aromatic hydrocarbon containing 6 to 12 carbon atoms, are used as synthesis components a) for introducing the oxadiazinetrione and/or uretdione structures corresponding to formulae (III) and (IV). The quantity in which they are used is selected such that, before the reaction with the cyanamide salts (V), the resulting polyurea has a content of 5 to 180 and preferably 15 to 100 milliequivalents of reactive groups corresponding to formulae (III) and/or (IV), based on 100 g unmodified polyurea.

The reaction of cyanamide salts (V) with the oxadiazinetrione or uretdione structure units corresponding to formula (III) or (IV) takes place in accordance with the following scheme:

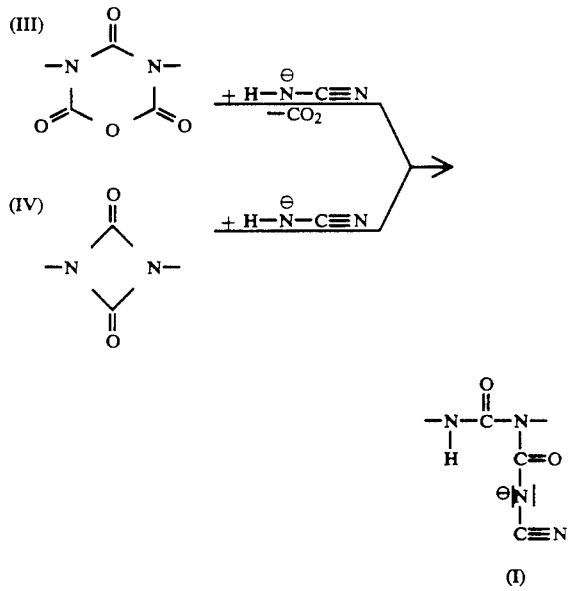

Under the conditions used for preparation of the prepolymer, only the isocyanate groups of the diisocyanates corresponding to formulas (VI) and (VII) used as synthesis components under a) are reactive with polyhydroxyl components b), the oxadiazinetrione or uretdione structures remaining intact. Examples of these polyisocyanates include 1,3-bis-(5-isocyanato-1,3,3-trimethyl-cyclohexylmethylene) -2,4-dioxo-1,3-diazetidine; 1,3-bis-(3-isocyanato-4-methylphenyl)-2,4-dioxo- 1,3-diazetidine; 1,3-bis-(6-isocyanatohexyl)- 2,4-dioxo-1,3-diazetidine; 3,5-bis-(5-isocyanato -1,3,3-trimethylcyclohexylmethylene)-2,4,6-trioxotetrahydro-1,3,5-oxadiazine; 3,5-bis-(4-isocyanatocyclo-hexyl) -2,4,6-trioxotetrahydro-1,3,5-oxadiazine and 3,5-bis-(6-isocyanatohexyl)-2,4,6-trioxotetrahydro-1,3,5-oxadiazine (Desmodur LB 202, available from Bayer AG).

Of the isocyanates corresponding to formulae (VI) and (VII), those of the oxadiazinetrione series (VI) are preferably used; 3,5-bis-(6-isocyanatohexyl)-2,4,6-trioxotetrahydro -1,3,5-oxadiazine being particularly preferred. Some of the polyisocyanates corresponding to formulae (VI) and (VII) are technical products. In their case, the isocyanate functionality can be greater than 2 and the molecular weight can be above the value of the pure materials. These technical products may of course be used in the practical application of the process according to the invention. To avoid unwanted crosslinking, it may be necessary to compensate for this increased functionality in known manner by using monofunctional NCO-reactive components, for example monoalcohols, in the production of the NCO prepolymer.

Other suitable synthesis components a) are organic compounds containing at least two free isocyanate groups per molecule. It is preferred to use diisocyanates $X(NCO)_2$ wherein X is a difunctional aliphatic hydrocarbon radical containing 4 to 12 carbon atoms, a difunctional cycloaliphatic hydrocarbon radical containing 6 to 15 carbon atoms, a difunctional aromatic hydrocarbon radical containing 6 to 15 carbon atoms or a difunctional araliphatic hydrocarbon radical containing 7 to 15 carbon atoms.

Examples of these preferred diisocyanates are tetraethylene diisocyanate, methyl pentamethylene diisocyanate, hexamethylene diisocyanate, dodecamethylene diisocyanate, 1,4-diisocyanato-cyclohexane, 1-isocyanato-3,3,5-trimethyl -5-isocyanatomethyl cyclohexane, 4,4'-diisocyanatodicyclohexyl methane, 4,4'-diisocyanatodicyclohexyl-2,2-propane, 1,4-diisoyanatobenzene, 2,4-diisocyanatotoluene, 2,6-diisocyanatotoluene, 4,4'-diisocyanatodiphenyl methane, 2,2'- and 2,4'-diisocyanatodiphenyl methane, p-xylylene diisocyanate, p-isopropylidene diisocyanate and mixtures of these compounds.

The known higher functionality polyisocyanates such as polyisocyanates containing carbodiimide groups, allophanate groups, isocyanurate groups, urethane groups and/or biuret groups, may of course also be used as a portion of component a).

"Polyfunctional NCO-reactive compounds" in the context of the invention are compounds containing an average of 1.8 to 4, preferably 1.8 to 2.5, NCO-reactive groups per molecule. Preferred NCO-reactive groups are hydroxyl groups and primary and secondary amino groups.

Preferred polyhydroxyl compounds b) are relatively high molecular weight compounds and include polyester, polyester amide, polycarbonate, polyacetal and polyether polyols having a molecular weight of at least 500, preferably 500 to 8,000 and more preferably 800 to 5,000.

Suitable polyester po-lyo-is include linear polyester diols or slightly branched polyester polyols which may be obtained in known manner from aliphatic, cycloaliphatic or aromatic di- or polycarboxylic acids or anhydrides with polyhydric alcohols. Examples of suitable acids include succinic, glutaric, adipic, pimellic, suberic, azelaic, sebacic, nonanedicarboxylic, decanedicarboxylic, terephthalic, isophthalic, o-phthalic, tetrahydrophthalic, hexahydrophthalic and trimellitic acid, and mixtures thereof. Examples of anhydrides include o-phthalic, trimellitic and succinic anhydride and mixtures thereof. Examples of suitable polyhydric alcohols include ethanediol, di-, tri-, tetraethylene glycol, 1,2-propanediol, di-, tri-, tetrapropylene glycol, IL,3-propanediol, 1,4-butanediol, 1,3-butanediol, 2,3-butanediol, 1,5-pentanediol, 1,6-hexanediol, 2,2-dimethyl-1,3-propanediol, 1,4-dihydroxy cyclohexane, 1,4-dimethylol cyclohexane, 1,8-octanediol, 1,10-decanediol, 1,12-dodecanediol and mixtures thereof. Higher functionality, such as trimethylol propane or glycerol, may also be used. Other suitable polyhydric alcohols for the production of the polyester polyols are cycloaliphatic and/or aromatic di- and polyhydroxyl compounds. Instead of the free polycarboxylic acids, it is also possible to use the corresponding polycarboxylic anhydrides or corresponding polycarboxylic acid esters of lower alcohols or mixtures thereof for the production of the polyesters.

The polyester polyols may of course also be homopolymers or copolymers of lactones which are preferably obtained by the addition of lactones or lactone mixtures, such as butyroactone, $\epsilon$-caprolactone and/or methyl-$\epsilon$-caprolactone, onto suitable difunctional and/or higher functional starter molecules such as the low niolecular weight polyhydric alcohols mentioned above as synthesis components for the polyester polyols. The corresponding polymers of $\epsilon$-caprolactone are particularly preferred.

Hydroxy-functional polycarbonates may also be used as polyhydroxyl component b). Examples include the hydroxy-functional polycarbonates which can be obtained by the reaction of diols, such as 1,4-butanediol and/or 1,6-hexanediol, with diaryl carbonates, for example diphenylcarbonate, or phosgene.

Examples of polyether polyols are the polyaddition products of styrene oxides, ethylene oxide, propylene oxide, tetrahydrofuran, butylene oxide, epichlorohydrin and also mixed addition products and graft products thereof and also the polyether polyols obtained by condensation of polyhydric alcohols or mixtures thereof and those obtained by the alkoxylation of polyhydric alcohols, amines and aminoalcohols. It is of course also possible to use mixtures of the compounds mentioned by way of example above as synthesis components b).

In addition, low molecular weight polyhydroxyl compounds, preferably diols having a molecular weight of 62 to 499, may also be used as components b). Suitable diols include the polyhydric and, in particular, dihydric alcohols described for the preparation of the polyester polyols and also low molecular weight polyester diols such as adipic acid bis-(hydroxyethyl)ester or short chain homo- and mixed addition products of ethylene oxide or propylene oxide using aromatic diols as initiators. Examples of aromatic diols which may be used as initiators for short-chain homopolymers and copolymers of ethylene oxide or propylene oxide include 1,4-, 1,3- and 1,2-dihydroxybenzene and 2,2-bis-(4-hydroxyphenyl)-propane (bisphenol A).

These preceding compounds are preferably used during the actual preparation of the NCO prepolymer.

To obtain special effects, for example to regulate molecular weight, monofunctional NCO-reactive compounds e) may optionally be used as synthesis components. These mono-functional compounds e) are used in quantities which do not detrimentally affect the properties of the end products. Examples of such monofunctional compounds e) include ammonia, monoamines and monohydric alcohols. Preferred monoamines include diethyl and dibutylamine. Preferred monohydric alcohols include mono-functional polyether alcohols, more preferably hydrophilic ethylene oxide homopolymers and copolymers, most preferably those containing incorporated ethylene oxide units which provide the modified polyurea according to the invention with a content of incorporated ethylene oxide units of up to 30% by weight, preferably up to 10% by weight. These monofunctional polyether alcohols are preferably incorporated during production of the prepolymer.

When monoamines e) are used as chain regulators, they are preferably used after chain extension with polyamines c). The monoamines e) may optionally be used in a quantity theoretically equivalent to the remaining NCO groups.

Suitable synthesis components c) include aliphatic and/or alicyclic primary and/or secondary polyamines such as 1,2-ethylenediamine, 1,6-hexamethylenediamine, 1-amino-3,3,5-trimethyl-5-aminomethyl cyclohexane (isophoronediamine), piperazine, 1,4-diaminocyclohexane, bis-(4-aminocyclohexyl)-methane, adipic acid dihydrazide and diethylenetriamine.

Other preferred polyamines c) are polyether polyamines which are formally obtained by replacement of the hydroxyl groups in the polyether polyols b) described above with amino groups. These polyether polyamines may be obtained by reaction of the corresponding polyether polyols with ammonia and/or primary amines.

Another preferred synthesis component c) is hydrazine or hydrazine hydrate.

Aminoalcohols such as ethanolamine, 2-propanolamine, diethanolamine or N-(2-hydroxyethyl)-ethylenediamine may be used as synthesis component d).

High molecular weight polyureas according to the invention may also be obtained by reaction of the NCO prepolymers according to the invention with water f) for chain extension.

The synthesis components a) to d) mentioned may also contain anionic carboxylate and/or sulfonate groups and may be at least partly used in this modified form. Synthesis components such as these and their use for the production of anionic polyurethanes or polyureas are described, for example, in Methoden der Organischen Chemie (Houben-Weyl), Vol. E 20, Thieme Verlag, Stuttgart 1989, pages 1659 et seq.

Since, however, the hydrophilic character of the resulting coatings is increased by these synthesis components, it is only desirable to use them when the total quantity of hydrophilic centers in the product is reduced through their use, for example by synergistic effects.

It is of course also possible to use the auxiliaries and additives which are known from polyurethane chemistry, for example, catalysts (such as tertiary amines, organometallic compounds, organotin compounds and organotitanium compounds), emulsifiers, anti-oxidants and hydrolysis stabilizers. These auxiliaries and additives may be incorporated at any stage during the production of the polyureas according to the invention.

The chain extension of the NCO prepolymers with the polyamines c) generally takes place at temperatures of 20 to 70° C., preferably 30 to 60° C.

The remaining isocyanate groups either react with water f) immediately or during subsequent processing to form urea groups, or take part to a small extent in the reaction with salts of cyanamide to form cyanourea anions (IV), although their content should preferably be less than 5 milliequivalents based on 100 g of modified polyurea.

The reaction time for the remaining isocyanate groups may vary between a few minutes and a few hours. A large part of the remaining isocyanate groups are reacted by water with accompanying chain extension, particularly with relatively long reaction times, so that the formation of cyanourea anions (IV) is minimized.

The NCO prepolymers are preferably diluted with water-miscible, low-boiling non-isocyanate-reactive solvents before the reaction with component c).

Suitable diluents for the NCO prepolymers include solvents from the series of cyclic ethers and open-chain ketones, preferably having boiling points below 100° C. Examples include tetrahydrofuran, butanone and acetone; acetone is particularly preferred. The prepolymers are diluted with an amount of solvent which is sufficient to provide solutions with a solids content of 20 to 70% by weight, preferably 30 to 50% by weight.

The polyamines c) may be used in the form of a dilute organic solution, but are preferably used in the form of a dilute aqueous solution.

The concentration of the amine solution may be varied within wide limits. When amines dissolved in water are used, however, it is important to ensure that the chain-extending reaction takes place in the homogeneous phase. If the amines c) are used in organic solution, the parameters regarding concentration, reaction temperature and reaction time previously set forth with regard to aqueous solutions apply. Acetone is preferably used as the organic solvent. Where monoamines e) are also used, the conditions mentioned above also apply.

The reaction with salts of cyanamide (V) may be carried out according to several embodiments. In one method the cyanamide may be initially introduced in solution, preferably in aqueous solution, and the base required to neutralize the cyanamide subsequently added either as a pure substance or in the form of a solution. In another method the cyanamide salt may be directly added in aqueous or organic solution. The preferred organic solvent is acetone.

The reaction temperature is generally kept between 20 and 80° C., preferably between 30 and 60° C. The quantity of cyanamide salt (V) used is between 50 and 100%, preferably between 70 and 95%, of the equivalent quantity, based on the total quantity of reactive groups (III) and (IV) in the polyurea. Any reactive groups (III) and/or (IV) still present after the reaction with cyanamide salt (V) may optionally be crosslinked with amines as described in U.S. Pat. No. 4,546,153. The reaction time is generally between a few minutes and a few hours. In the case of the preferred oxadiazinetrione structures, the reaction is easy to follow. The reaction is over when the evolution of carbon dioxide stops. When the reaction is carried out in water, the quantity of water used should be gauged in such a way that the reaction system remains a single-phase system. However, it is not as critical during this step to maintain a single-phase system as it is during the chain extension reaction; an incipient two-phase system can be tolerated.

The cyanamide may be neutralized with either inorganic bases (such as ammonia and sodium hydroxide or carbonate) or organic bases, e.g., tertiary or ternary amines (such as triethylamine, trimethylamine, tris-isopropylamine, tri-n-butylamine, N,N-dimethylaminoethanol, tris-isopropanolamine, pyridine and N-methyl morpholine). Preferably volatile bases, more preferably ammonia and triethylamine, are used.

On completion of the reaction with the cyanamide salts (V), the reaction product obtained may be converted into a dispersion by dilution with water and removal of the organic solvent used by distillation.

In principle, the NCO prepolymers may be produced by any of the variations known from polyurethane chemistry to provide the desired hard and soft segment lengths and appropriate distribution of these segments.

The polyureas according to the invention may be used as binders for coating compositions and are particularly suitable in the form of aqueous dispersions for coating of sheet-form materials such as leather, textiles, wood, plastics, paper and metallic and mineral substrates.

The materials may be coated by known methods, for example, by spray coating, knife coating or pressure coating. Typical auxiliaries and additives such as nonionic and/or anionic thickeners, pigments, waxes, feel-promoting additives and dyes may be used. The dispersions according to the invention may also be mixed with other anionic and/or nonionic dispersions such as butadiene, acrylate or polyurethane latices. The limitations and precautionary measures known to the expert apply in the case of cationic dispersions.

Although the polyureas according to the invention are substantially non-hydrophilic after drying, it can be advantageous to subject them to additional crosslinking. Suitable crosslinking agents include water-soluble or water-dispersible compounds such as polyisocyanates, polyepoxides, polycarbodiimides or polyaziridines, which are known from the prior art. Formaldehyde or melamine/formaldehyde reaction products, optionally in etherified form, may also be used as crosslinking agents for the polyureas according to the invention.

In the following examples, percentages are by weight except for the elongation values.

The average particle sizes (number average) of the polyurea dispersions were determined by laser correlation spectroscopy using a Malvern Autosizer II (Malvern Inst. Limited).

The viscosities are expressed as the flow times from a DIN 4 mm cup measured in accordance with DIN 53 211.

EXAMPLES

Example 1

2240 g of a difunctional hexanediol polycarbonate diol (OH no. 56) and 178 g of a monofunctional polyether rich in ethylene oxide (78% ethylene oxide content, OH no. 26) were freed from water at 120° C./15 mbar. 336.4 g of 3,5-bis-(6-isocyanatohexyl)-2,4,6-trioxotetrahydro-1,3,5-oxadiazine (technical product, MW 453.6), 200.9 g of hexamethylene diisocyanate and 442.4 g of isophorone diisocyanate were added at 80° C. After reacting for 1 hour at 80° C., 94.8 g of 1,4-butanediol were added. After 90 minutes, the prepolymer was diluted with 6500 g of acetone. 36.0 g of ethylenediamine and 25.0 g of hydrazine hydrate in 500 g of water were added to the resulting solution, followed by stirring for 7 minutes at 50° C. A solution of 33.6 g of cyanamide and 80.7 g of triethylamine in 300 g of acetone was then added. After 60 minutes, the evolution of $CO_2$ was completed. The reaction mixture was diluted with 8600 g of water and the acetone was subsequently distilled off under reduced pressure.

A fine particle dispersion having an average particle size of the disperse phase of approx. 73 nm, a solids content of 31.4% and a viscosity equivalent to a flow time of 12.5 s was obtained.

Example 2

2240 g of a difunctional hexanediol polycarbonate diol (OH No. 56), 82 g of a difunctional propylene oxide polyether (OH No. 56) and 95 g of 1,4-butanediol were freed from water at 120° C./15 mbar. 363.0 g of 3,5-bis-(6-isocyanatohexyl)-2,4,6 -trioxotetra-hydro-1,3,5-oxadiazine (technical product, MW 422.0), 200.9 g of hexamethylene diisocyanate and 422.0 g of isophorone diisocyanate were added at 80° C. After reacting for 4 hours at 80° C., the prepolymer was diluted with 7000 g of acetone. 36.0 g of ethylenediamine and 25.0 g of hydrazine hydrate in 500 g of water were added to the resulting solution, followed by stirring for 20 minutes at 45° C. A solution of 33.6 g of cyanamide in 400 g of water was then added. 20 minutes later, 80.7 g of triethylamine were added. After 60 minutes, the evolution of $CO_2$ was completed. The reaction mixture was diluted with 8000 g of water and the acetone was subsequently distilled off under reduced pressure.

A fine particle dispersion having an average particle size of the disperse phase of approx. 71 nm, a solids content of 34.5% and a viscosity equivalent to a flow time of 13 s was obtained.

A film obtained from the dispersion by knife coating had a Shore A hardness (DIN 53 505) of 85, a modulus at 100% elongation of 6.4 MPa (DIN 53 504), an ultimate tensile strength of 25.1 MPa and an elongation at break of 350%.

A mixture containing 12% PUR solids and 1.8% $SiO_2$ was prepared by dilution with water and a commercially available silicate flatting agent (9.0% $SiO_2$). A black-primed furniture nappa was finished with this mixture by spraying (approx. 5 g/0.25 square foot). After drying, the finish had a fastness to wet rubbing (Veslic,DIN 53 339) of 1850 strokes with no damage to the finish or staining of the felt.

Example 3

2240 g of a difunctional hexanediol polycarbonate diol (OH No. 56) and 82 g of a difunctional propylene oxide polyether (OH No. 56) were freed from water at 120° C./15 mbar. 363.0 g of 3,5-bis-(6-isocyanatohexyl)-2,4,6-trioxotetrahydro -1,3,5-oxadiazine (technical product, MW 422.0), 67.2 g of hexamethylene diisocyanate and 184.3 g of isophorone diisocyanate were added at 80° C. After 3 h at 90° C., the prepolymer was diluted with 6000 g of acetone. 18.0 g of ethylenediamine and 12.5 g of hydrazine hydrate in 300 g of water were added to the resulting solution, followed by stirring for 15 minutes at 50° C. A solution of 33.6 g of cyanamide in 400 g of water was then added. 20 minutes later, 80.7 g of triethylamine were added. After 45 minutes, the evolution of $CO_2$ was completed. The reaction mixture was diluted with 6000 g of water and the acetone was subsequently distilled off under reduced pressure.

A fine particle dispersion having an average particle size of the disperse phase of approx. 95 nm, a solids content of 32.5% and a viscosity equivalent to a flow time of 12 s was obtained.

A film prepared from the dispersion by knife coating had a Shore A hardness of 65, a modulus at 100% elongation of 2.9 MPa, an ultimate tensile strength of 20.5 MPa and an elongation at break of 580%.

A sprayable mixture was prepared and applied in the same way as in Example 2. After drying, the finish had a fastness to wet rubbing (Veslic, DIN 53 339) of 1800 strokes with no damage to the finish or staining of the felt.

Example 4

2240 g of a difunctional hexanediol polycarbonate diol (OH No. 56) and 178 g of a monofunctional polyether rich in ethylene oxide (78% ethylene oxide content, OH No. 26) and 95.0 g of 1,4-butanediol were freed from water at 120° C./15 mbar. 363.0 g of 3,5-bis-(6-isocyanatohexyl)-2,4,6-trioxotetrahydro -1,3,5-oxadiazine (technical product, MW 422.0), 200.9 g of hexamethylene diisocyanate and 442.4 g of isophorone diisocyanate were added at 80° C., followed by reaction for 4 h at 90° C. The prepolymer was diluted with 6500 g of acetone. 46.2 g of ethylenediamine and 32.0 g of hydrazine hydrate in 500 g of water were added to the resulting solution, followed by stirring for 20 minutes at 50° C. Another 90.4 g of dibutylamine in 200 g of acetone were then added and the mixture was stirred for another 45 minutes. 33.6 g of cyanamide in 300 g of water were added to the solution and, after complete homogenization, 80.7 g of triethylamine in 100 g of acetone were introduced. After 60 minutes, the evolution of $CO_2$ was completed.

The mixture was diluted with 8000 g of water and the acetone was subsequently distilled off under reduced pressure.

A fine particle dispersion having an average particle size of the disperse phase of approx. 85 nm, a solids content of 33.5% an(i a viscosity equivalent to a flow time of 14 s was obtained.

Example 5

2240 g of a difunctional hexanediol polycarbonate diol (OH no. 56) and 216 g of a monofunctional polyether rich in ethylene oxide (78% ethylene oxide content, OH no. 26) were freed from water at 120° C./15 mbar. 448.0 g of of a technical polyisocyanate having an isocyanate content of 21% and a content of approx. 75% of 1,3-bis-(6-isocyanatohexyl) -2,4-dioxo-1,3-diazetidine (Desmodur VP-LS 2550, available from Bayer AG), 155.0 g of hexamethylene diisocyanate and 442.4 g of isophorone diisocyanate were added at 85° C. After a reaction time of 1.5 h at 85° C., 94.8 g of 1,4-butanediol were added. After 1 h at 100° C., the prepolymer was diluted with 8000 g of acetone. 30.0 g of ethylenediamine and 25.0 g of hydrazine hydrate in 500 g of water were added to the solution, followed by stirring for 20 minutes at 50° C. 148 g of dibutylamine in 150 g of acetone were then added, followed by stirring for another 15 minutes. A solution of 40.0 g of cyanamide in 400 g of water was then added. After complete homogenization, 95.8 g of triethylamine were added. After 40 minutes, the mixture was diluted with 6400 g of water and the acetone was subsequently distilled off under reduced pressure. A fine particle dispersion having an average particle size of the disperse phase of approx. 90 nm, a solids content of 41.4% and a viscosity equivalent to a flow time of 16 s was obtained. Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyurea which contains anionic N-cyanaminocarbonyl urea groups corresponding to formula (I)

incorporated in the polymer chain and, optionally, terminal anionic cyanourea groups corresponding to formula (II)

wherein the ratio of incorporated groups (I) to terminal groups (II) is more than 1:1.

2. The polyurea of claim 1 in which the ratio of incorporated groups (I) to terminal groups (II) is more than 2:1.

3. The polyurea of claim 1 which contains 10 to 100 milliequivalents of groups (I) and less than 50 milliequivalents of group (II) per 100 g of modified polyurea.

4. The polyurea of claim 3 in which the ratio of incorporated groups (I) to terminal groups (II) is more than 2:1.

5. A process for the production of a polyurea which contains anionic N-cyanaminocarbonyl urea groups corresponding to formula (I)

incorporated in the polymer chain and, optionally, terminal anionic cyanourea groups corresponding to formula (II)

wherein the ratio of incorporated groups (I) to terminal groups (II) is more than 1:1,
which comprises reacting a polyurea starting material containing oxadiazinetrione structural units corresponding to formula (III)

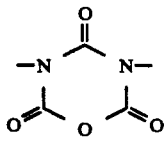
(III)

and/or uretdione structural units corresponding to formula (IV)

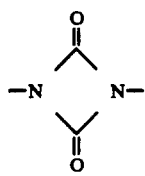
(IV)

with a cyanamide salt corresponding to formula (V)

(V)

wherein

Ka⊕ is an alkali metal ion or an optionally substituted ammonium ion.

6. The process of claim 5 wherein said oxadiazinetrione structural units and/or said uretdione structural units are incorporated into the polyurea starting material by a member selected from the group consisting of diisocyanates corresponding to formulas (VI) and (VII)

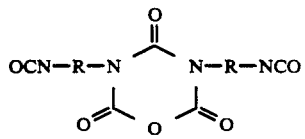
(VI)

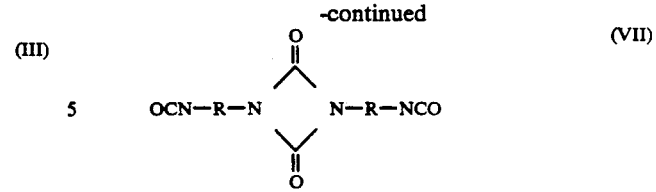
(VII)

wherein the R's may be the same different and represent the difunctional radical of an aliphatic hydrocarbon containing 1 to 15 carbon atoms, a cycloaliphatic hydrocarbon containing 3 to 15 carbon atoms, an araliphatic hydrocarbon containing 7 to 15 carbon atoms or an aromatic hydrocarbon containing 6 to 12 carbon atoms, the structural units being present in an amount such that, before the reaction with the cyanamide salt (V), the polyurea starting material has a content of 5 to 180 milliequivalents of reactive groups corresponding to formulas (III) and/or (IV), based on 100 g of the polyurea starting material.

7. The process of claim 6 which comprises incorporating oxadiazinetrione structural units into the polyurea starting material with 3,5-bis-(6-isocyanatohexyl)-2,4,6-trioxotetrahydro-1,3,5-oxadiazine.

8. A process of claim 6 wherein said starting material polyurea is prepared by reacting an NCO prepolymer having an isocyanate content of 0.5 to 10% by weight with an isocyanate-reactive compound.

9. The process of claim 8 wherein the NCO prepolymer has an NCO content of 1.5 to 7.5% by weight.

10. The process of claim 8 which comprises reacting 30 to 95% of the isocyanate groups of the NCO prepolymer with a polyamine and/or aminoalcohol and reacting the remainder of the isocyanate groups with water.

11. The process of claim 8 which comprises reacting 50 to 80% of the isocyanate groups of the NCO prepolymer with a polyamine and/or aminoalcohol and reacting the remainder of the isocyanate groups with water.

* * * * *